(12) United States Patent
Bank et al.

(10) Patent No.: US 9,892,097 B2
(45) Date of Patent: Feb. 13, 2018

(54) ENABLING ABSOLUTE POSITIONING WITH PUBLISHABLE HTML CODE

(71) Applicant: Adobe Systems Incorporated, San Jose, CA (US)

(72) Inventors: Christopher R. Bank, Irvine, CA (US); Jacob Aaron Surber, Foster City, CA (US); Kristofer G. Joseph, Emeryville, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 750 days.

(21) Appl. No.: 13/854,845

(22) Filed: Apr. 1, 2013

(65) Prior Publication Data

US 2014/0298163 A1 Oct. 2, 2014

(51) Int. Cl.
*G06F 17/00* (2006.01)
*G06F 17/22* (2006.01)
*G06F 17/21* (2006.01)

(52) U.S. Cl.
CPC ........ *G06F 17/2247* (2013.01); *G06F 17/211* (2013.01)

(58) Field of Classification Search
None
See application file for complete search history.

(56) References Cited

U.S. PATENT DOCUMENTS

| | | | | |
|---|---|---|---|---|
| 8,135,616 | B2 * | 3/2012 | Callaghan | G06Q 30/02 705/14.4 |
| 8,539,385 | B2 * | 9/2013 | Capela | G06F 3/0488 715/764 |
| 8,972,879 | B2 * | 3/2015 | Migos | G06F 3/04845 715/702 |
| 2003/0217076 | A1 * | 11/2003 | Heptinstall | G06F 17/30905 |
| 2006/0242557 | A1 * | 10/2006 | Nortis | G06F 3/0482 715/234 |
| 2009/0326966 | A1 * | 12/2009 | Callaghan | G06Q 30/02 705/1.1 |
| 2010/0037168 | A1 * | 2/2010 | Thayne | G06F 17/24 715/769 |
| 2010/0251092 | A1 * | 9/2010 | Sun | G06F 17/243 715/222 |
| 2010/0293510 | A1 * | 11/2010 | Bockus | G06F 3/0481 715/862 |
| 2010/0321405 | A1 * | 12/2010 | MacInnes | G06T 3/00 345/635 |

(Continued)

*Primary Examiner* — Stephen Hong
*Assistant Examiner* — Gregory Vaughn
(74) *Attorney, Agent, or Firm* — Wolfe-SBMC (57) ABSTRACT

This document describes techniques and apparatuses that enable absolute positioning with publishable HTML code. These techniques permit a designer to place objects at absolute positions in a design interface and see how a webpage will actually look in response to that placement. A designer need not publish the design before seeing how it will actually look because the design interface determines and then uses publishable HTML code to present the design, even in real time. Furthermore, in some embodiments, the techniques provide real-time feedback showing parameters of the publishable HTML code, thereby permitting the designer to quickly and easily change the publishable HTML code by altering the shown parameters.

20 Claims, 9 Drawing Sheets

(56) References Cited

U.S. PATENT DOCUMENTS

| | | | | |
|---|---|---|---|---|
| 2011/0185321 A1* | 7/2011 | Capela | ............... | G06F 3/0488 |
| | | | | 715/863 |
| 2011/0283210 A1* | 11/2011 | Berger | ............ | G06F 17/30244 |
| | | | | 715/765 |
| 2012/0030569 A1* | 2/2012 | Migos | ............... | G06F 3/04845 |
| | | | | 715/702 |
| 2012/0066573 A1* | 3/2012 | Berger | ............. | H04N 1/00196 |
| | | | | 715/202 |
| 2012/0254714 A1* | 10/2012 | Peters | ............... | G06F 17/243 |
| | | | | 715/209 |

* cited by examiner

ENABLING ABSOLUTE POSITIONING WITH PUBLISHABLE HTML CODE

BACKGROUND

Many current design interfaces for building webpages are either flow-based or absolute-positioning Flow-based design interfaces place objects at relative locations during webpage design while absolute-positioning design interfaces place objects at absolute locations during webpage design. Thus, when an object is moved in a flow-based interface, the flow-based interface will place the selected object relative to other objects in the interface rather than at an absolute location in the interface. The flow-based interface places the object above or below or right or left relative to existing objects and moves existing objects to accommodate the moved object. Many designers, however, consider flow-based design interfaces irritating and ineffective because these interfaces do not permit designers to move objects wherever they wish and maintain positions of other, unmoved objects. A designer may wish to move an object to a particular absolute location but with flow-based design is not permitted to do so. Rather than be permitted to place the object at a desired location the interface instead places it relative to objects in the interface.

In contrast, absolute-positioning design interfaces permit designers to move an object wherever the designer chooses. Absolute-positioning interfaces, however, estimate, during design, what a final webpage will look like. These estimates are often wrong and require additional processing to create publishable HTML code, which results in an unsatisfactory design experience for many designers.

SUMMARY

This document describes techniques and apparatuses that enable absolute positioning with publishable HTML code. These techniques permit a designer to place objects at absolute positions in a design interface and see how a webpage will actually look in response to that placement. A designer need not publish the design before seeing how it will actually look because the design interface determines and then uses publishable HTML code to present the design, even in real time. Furthermore, in some embodiments, the techniques provide real-time feedback showing parameters of the publishable HTML code, thereby permitting the designer to quickly and easily change the publishable HTML code by altering the shown parameters.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

This document describes various apparatuses and techniques that enable a designer to select absolute positions for objects while representing these selections accurately with publishable HTML code. In so doing, the techniques can provide a design interface that enables What-You-See-Is-What-You-Get (WYSIWYG) editing of HTML webpages while permitting, at the same time, absolute positioning of HTML objects. Further, the techniques may do so in real time. This permits a designer to move or otherwise alter some absolute-location aspect of an HTML object, see an accurate representation of this selection as it is being made, and create HTML code that is publishable. This publishable HTML code not only shows the selection as it will be represented in a browser, but future post-processing or publishing steps can be made unnecessary.

Furthermore, this document describes techniques that provide real-time feedback indicating how a selection of an HTML object affects the "flow" or layout of the webpage. This representation can be displayed in the form of parameters that are within the publishable HTML code. These parameters, such as pixel-sized margins between a selected HTML object and a neighboring object, can be seen and altered by the designer. In so doing, a designer may quickly, easily, and/or accurately create and refine webpages with HTML objects.

Assume, for example, that a designer moves an HTML object from a lowest point of an HTML webpage to an absolute position that is between two HTML objects. This absolute position is fixed on the page rather than relative to other objects, such as an X and Y coordinate on the page. If the current margin (prior to the move) between these HTML objects is a total of 140 pixels, and the moved HTML object is a 120-pixel square, the techniques may alter the margins of these neighboring HTML objects without moving either of them.

Further, the techniques can display these new margins (e.g., 10 pixels above and below the moved HTML object), allowing the designer to quickly alter them. Thus, if the designer wants a larger margin between the moved HTML object and the neighboring objects the designer may quickly and easily increase them by altering the displayed new margin. The techniques, in response to this alteration, will move at least one of the HTML objects. If the designer is happy with the margins as shown, however, the designer can simply be done. The designer does not need to publish the webpage, decide if it looks right, make alterations, and then publish it again, as is common to some current techniques.

This document now turns to an example environment in which the techniques can be embodied, after which various example methods for performing the techniques are described. Example methods may be performed in the example environment as well as other environments. Consequently, performance of the example methods is not limited to the example environment and the example environment is not limited to performance of the example methods. Note also that these techniques and/or apparatuses are referred to separately or in conjunction as the "techniques" as permitted by the context.

Example Environment

Figure 1:
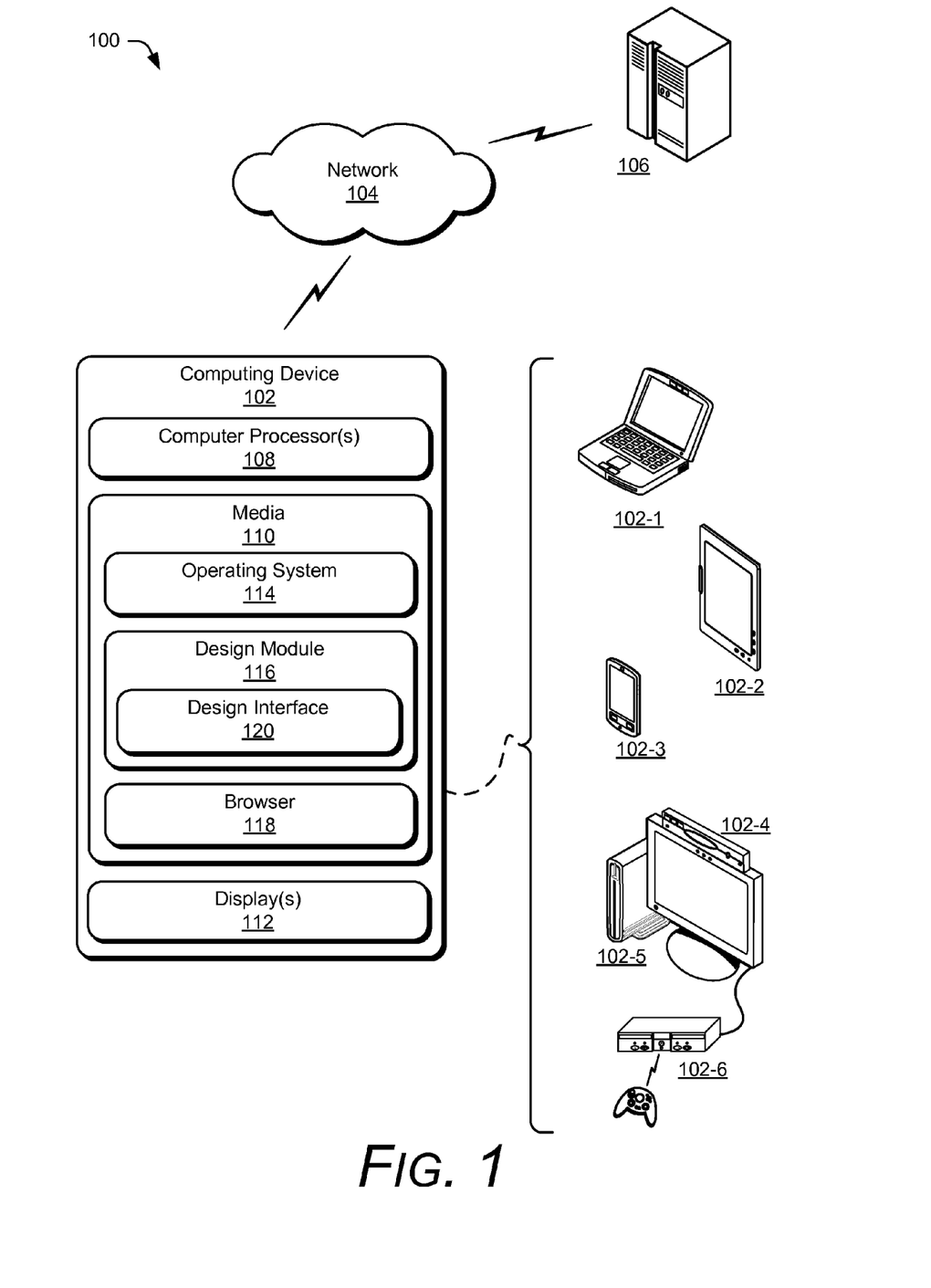
FIG. 1 illustrates an environment in which techniques for enabling absolute positioning with publishable HTML code may be performed.

FIG. 1 illustrates an example environment 100 in which techniques that enable absolute positioning with publishable HTML code can be embodied. Environment 100 includes a computing device 102, a network 104, and a server computer 106. Network 104 enables communication between computing device 102 and server computer 106, and may be wired, wireless, or a combination thereof. While both computing device 102 and server computer 106 are shown, in some cases only one of these devices is used.

Computing device 102 is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Computing device 102 includes or has access to computer processor(s) 108, computer-readable storage media 110 (media 110), and one or more displays 112, four examples of which are illustrated in FIG. 1. Media 110 includes an operating system 114, design module 116, and browser 118. Design module 116 includes a design interface 120, which presents pages being designed, HTML objects within those pages, and enables selection to move, add, remove, and resize the HTML objects.

Design module 116 determines publishable HTML code based on an absolute position selected for an HTML object. As noted in part above, when an HTML object is placed at a selected position in the HTML page, that selected position is not altered by design module 116. Further, other HTML objects on the HTML page are not necessarily moved to accommodate the HTML object's selected position. Thus, on selecting a position in the HTML page, the selected position is absolute rather than subject to being moved relative to other HTML objects on the HTML page. This absolute position in an HTML page can be based on various coordinate systems, such as at an X and Y coordinate on the page relative to an upper-left pixel or center-most pixel of the HTML page, or relative to an HTML object on which a coordinate is based (e.g., a pixel of a parent HTML object).

Design module 116 may determine this publishable HTML code, in many cases, while maintaining positions occupied by other HTML objects in the HTML page. Thus, if a designer adds or moves an HTML object within design interface 120, design module 116 determines publishable HTML code for that addition or move.

Publishable HTML code is code that does not need post-processing or to be published prior to accurately presenting a page, in contrast to many estimated representations of webpages used by current design interfaces. Publishable HTML code enables an accurate presentation of a webpage being designed, and thus back-and-forth editing and publishing can be avoided.

In some cases an HTML object is placed or altered in such a way that no publishable HTML code can be determined, such as when a placement causes a page failure. This can happen when multiple HTML objects occupy a same space, though even in these cases a negative margin (e.g., an overlap of the HTML objects) can sometimes be used to permit such a placement. Design module 116 may move objects if altering parameters of the objects, such as margins and clearing properties, is not insufficient to prevent a page failure or responsive to a default or explicit instruction from a designer.

As noted in part above, design module 116 may determine publishable HTML code in real time, even while an HTML object is being moved within design interface 120. Further, this determining of publishable HTML code enables design module 116 to present a What-You-See-Is-What-You-Get (WYSIWYG) design experience in design interface 120.

Design interface 120 present HTML objects and enables selection of these and other HTML objects. These selections can add, remove, move, or resize a selected HTML object within an HTML page of design interface 120. Further, selection can be through various input devices, including keyboards, hotkeys, mice, voice activation, and gestures made through a gesture sensitive display. In one example, design interface 120 allows a designer to move, through a drag-and-drop selection, a selected HTML object from a prior position in an HTML page to an absolute position in the HTML page.

Note that this document uses the term HTML (HyperText Markup Language) to refer to markup languages generally, and thus the term HTML may include other markup languages, such as XHTML (eXtensible HTML) or SGML (Standard Generalized Markup Language).

Computing device 102 may be configured as a full resource device with substantial memory and processor resources (e.g., personal computers, game consoles), a mid-resource device with moderate memory and resources (e.g., a netbook), or a low-resource device with limited memory and/or processing resources (e.g., mobile devices, automobile computing devices, computers within children's toys, kitchen appliances with computing abilities). Computing device 102 may be representative of one or a plurality of different devices, such as multiple servers utilized by a business to perform operations "over the cloud" as further described in relation to FIG. 9.

Ways in which entities and components of FIG. 1 act and interact are set forth in greater detail below. The components illustrated for computing device 102 can be separate or integrated and operate as part of a web platform as described in relation to FIG. 9, for example. Thus, design module 116 may be operating on server computer 106 effective to provide design interface 120 on tablet computer 102-2, for example. Regardless of where implemented, design module 116 is representative of functionality that is configured to enable absolute positioning with publishable HTML code.

Example Methods

The following discussion describes methods that enable absolute positioning with publishable HTML code, such as in designing webpages. Aspects of each of the methods may be implemented in hardware, firmware, or software, or a combination thereof. The methods are shown as a set of blocks that specify operations performed by one or more devices and are not necessarily limited to the orders shown for performing the operations by the respective blocks. In portions of the following discussion, reference will be made to FIG. 1 by way of example only.

Figure 2:
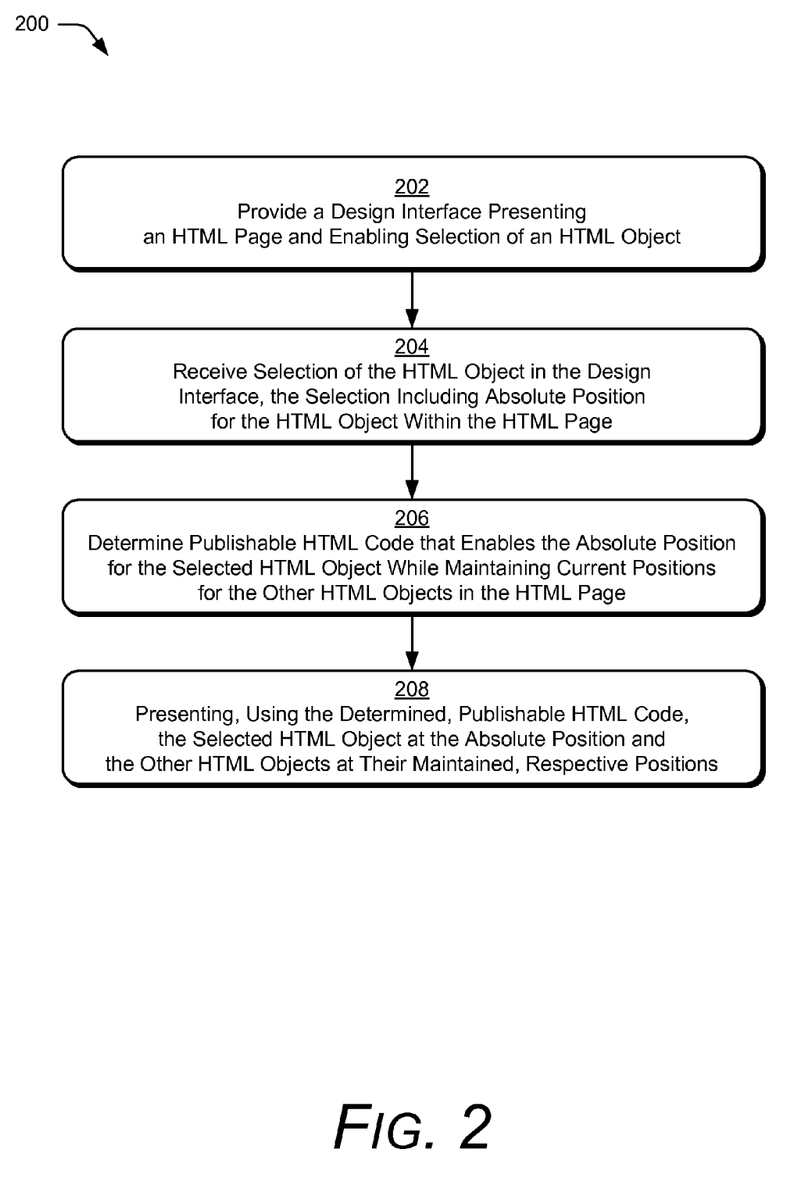
FIG. 2 is a flow diagram showing methods for enabling absolute positioning with publishable HTML code.

FIG. 2 depicts methods 200 in an example implementation in which the techniques enable absolute positioning with publishable HTML code. Methods 200 enable absolute positioning by determining publishable HTML code responsive to selection of HTML objects.

Block 202 provides a design interface presenting an HTML page and enabling selection of an HTML object. Design module 116 may place HTML objects on the HTML page based on CSS (Cascading Style Sheet) float, margin, and clearing properties of the HTML objects, though they may instead be placed in other manners.

Figure 3:
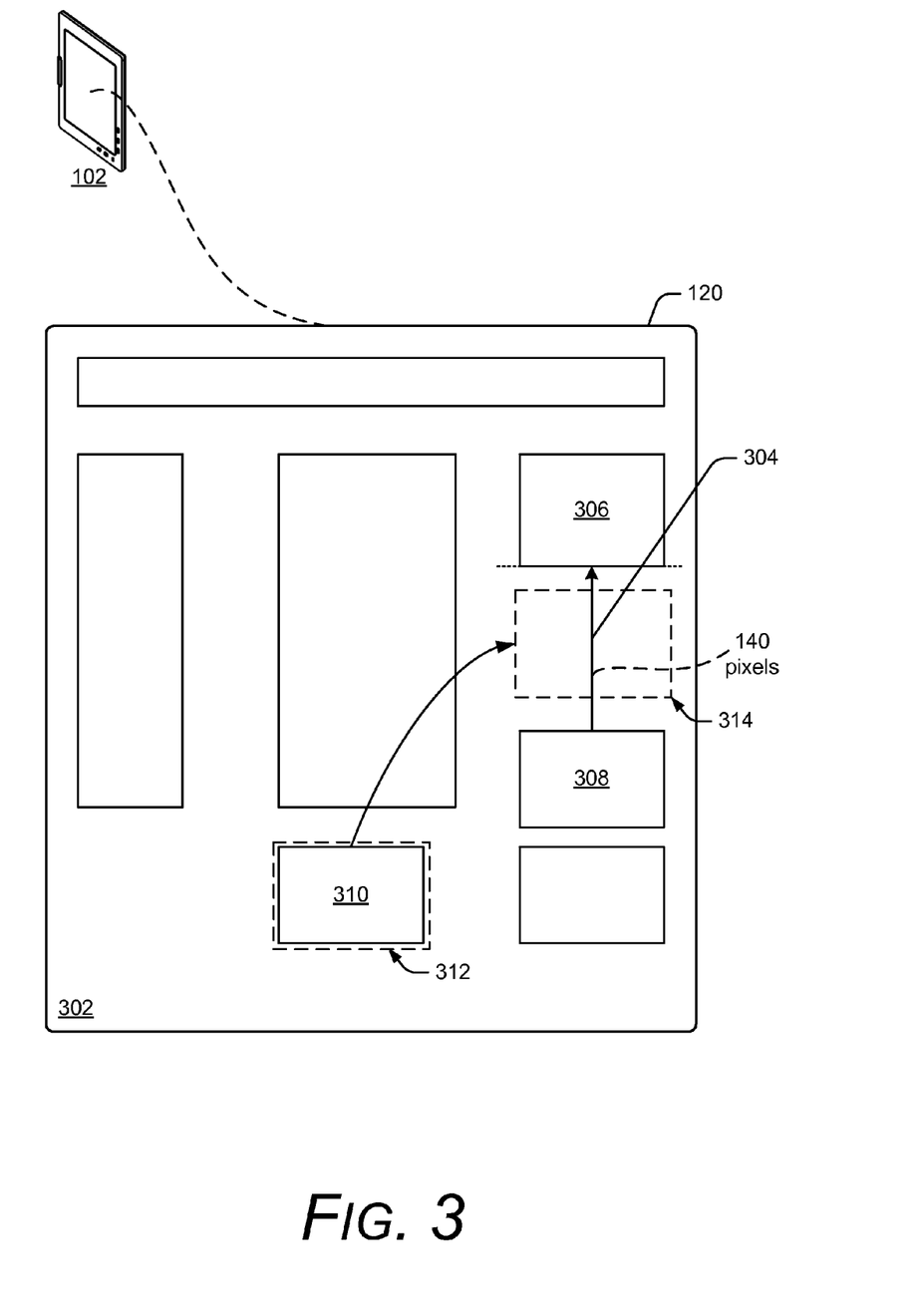
FIG. 3 illustrates a tablet computer of FIG. 1 that presents a design interface for editing a webpage.

By way of an ongoing example, consider FIG. 3, which illustrates tablet computer 102-2 presenting design interface 120, both of which are illustrated also in FIG. 1. Design interface 120 enables editing of a webpage 302. Webpage 302 includes seven HTML objects having various parameters. One particular parameter is a margin 304 of 140 pixels, shown between object 306 and object 308.

Block 204 receives selection of an HTML object in the design interface, the selection of the HTML object including absolute position for the HTML object within an HTML page. For the ongoing example, assume that design interface 120 receives a selection to move object 310 from a current location 312 to an absolute position 314 between object 306 and object 308.

Block 206 determines publishable HTML code that enables the absolute position for the selected HTML object while maintaining positions currently occupied by other HTML objects in the HTML page. As noted in part above, determining publishable HTML code can be performed in various manners, including determining Cascading Style Sheet (CSS) parameters affected by the selection, e.g., float, margin, and clearing values. CSS margins are used in the ongoing example.

Figure 4:
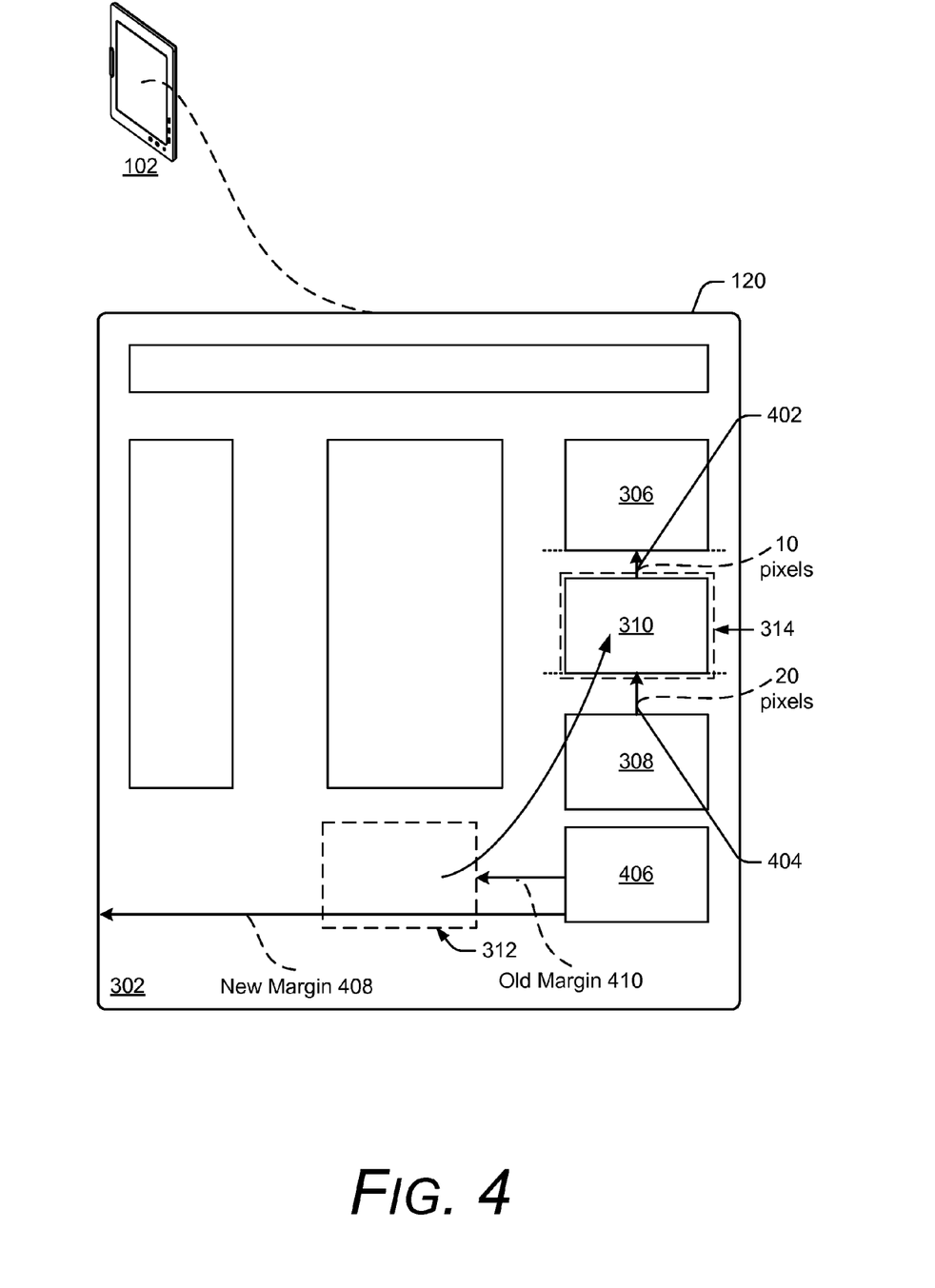
FIG. 4 illustrates the webpage of FIG. 3 with an HTML object moved to an absolute position.

Continuing this example, consider FIG. 4, which illustrates webpage 302 of FIG. 3 with object 310 moved to absolute position 314. Here design module 116 determines margins that enable placement of object 310 at absolute position 314. One margin is 10 pixels shown at margin 402 and another margin is 20 pixels shown at margin 404. While not required, many markup languages are structured from top-to-bottom and from left-to-right, thus, margins and parameters of an object are relative to a neighboring object or border on the object's left or above the object.

Note also that other margins and parameters can be determined in order to maintain positions of other HTML objects. Object 406, for example, had a small margin to current location 312 at which object 310 previously resided. Absent modification of this margin, object 406 would be moved to the left of the page. Design module 116, however, determines a new margin 408, here a much larger margin than old margin 410, sufficient to maintain the position of object 406. With these margins and other parameters determined, design module 116 determines publishable HTML code enabling this move in real time and accurately representing how a browser will present webpage 302 when a browser uses the publishable HTML code to present webpage 302.

In some cases the techniques determine publishable HTML code as a selected object is moved, such as in a drag-and-drop selection. In these cases, design module 116 may determine intermediate, publishable HTML code for use during this movement. Design module 116 can flag changes made to HTML objects neighboring the selected HTML object. These flagged changes can be made within the intermediate, publishable HTML code. Then, using these flags, design module 116 can return the other HTML objects to their prior locations if their final absolute positions after movement of the selected HTML object no longer require position changes.

Figure 5:
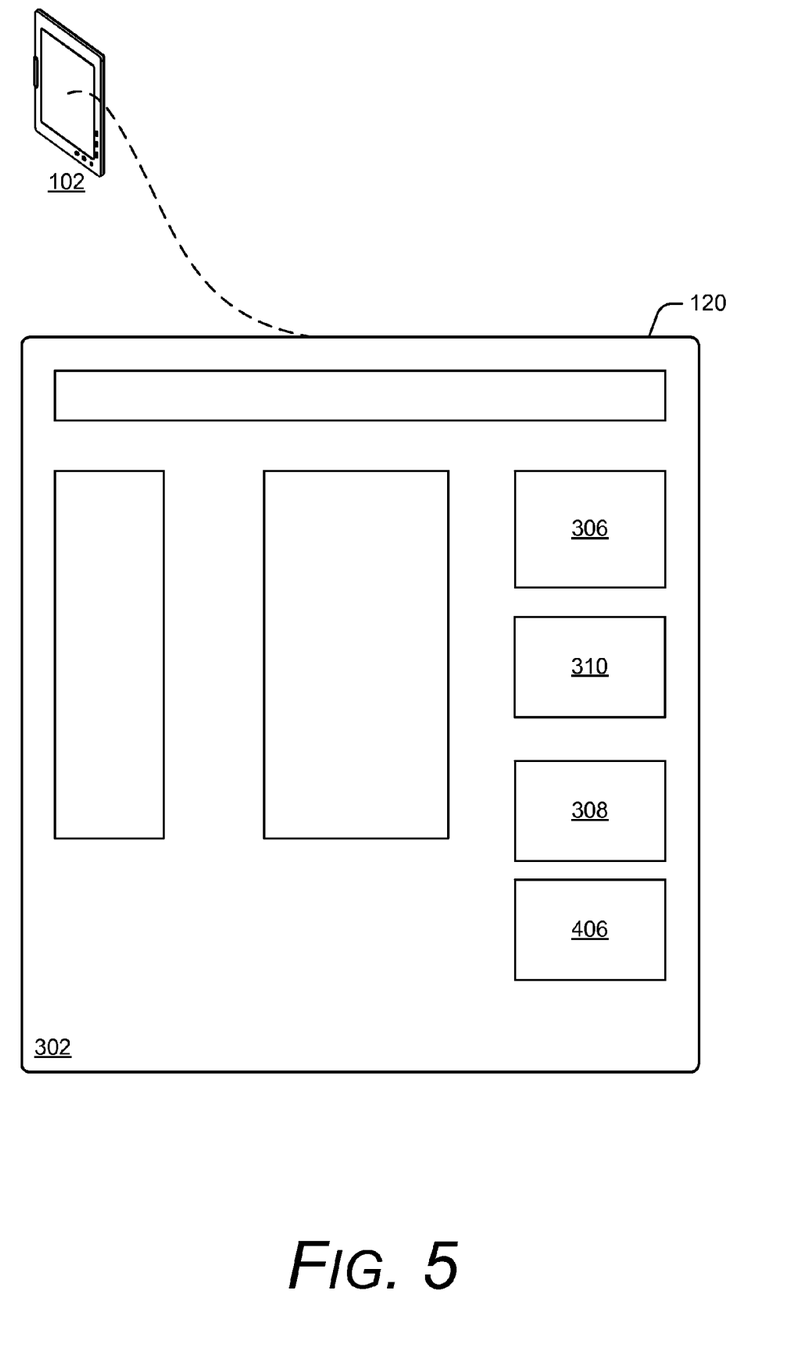
FIG. 5 illustrates the webpage of FIGS. 3 and 4 but presented using determined, publishable HTML code in real time and accurately showing the webpage as it will be presented by a browser.

Block 208 presents, using the determined, publishable HTML code, the selected HTML object at the absolute position and the other HTML objects at their respective positions. Concluding the present example, consider FIG. 5, which shows design interface 120 having webpage 302 presented using the determined, publishable HTML code in real time and accurately showing webpage 302 as it will be presented by browser 118. Note that in some embodiments design module 116 presents a page including parameters that may be changed by a designer, which will be described in greater detail below. Here, however, webpage 302 is presented without annotations, as it will be presented in browser 118.

Note that design module 116 may act in alternative or additional manners to those described in the above example. In some embodiments, for example, design module 116 determines publishable HTML code based on negative margin values, such as when an object is placed over another object on the page. Further, design module 116 may determine a location for a selected HTML object in a Document Object Model (DOM, e.g., a DOM tree) for the HTML page, the location being a new location and based on the absolute position. Design module 116, in the above example, moved object 310 from a lower position in a DOM tree for webpage 302 to a higher position in the DOM tree responsive to the selection to move object 310 from its current location 312 of FIG. 3 to absolute position 314 of FIGS. 3 and 4.

Further still, design module 116 may determine CSS values responsive to selecting the selected HTML object at the absolute position, such as CSS float, margin, and clearing properties. In such a case, design module 116 may use clearing properties to take into account whether both, left, right, or no properties are to be addressed. CSS margin calculations take into consideration whether or not to allow negative margins, as noted above, and for maintaining margins or altering these margins. CSS float values specify whether an HTML object should float to the left, right, or not at all.

In embodiments combining CSS values and the DOM, design module 116 may parse the DOM to determine current locations in the page for the other, non-moving objects. Design module 116 determines, based on the absolute position of the selected HTML object and these CSS values, those of the other HTML objects that will not be altered. Design module 116 may store these current locations for later use in creating the publishable HTML code.

Figure 6:
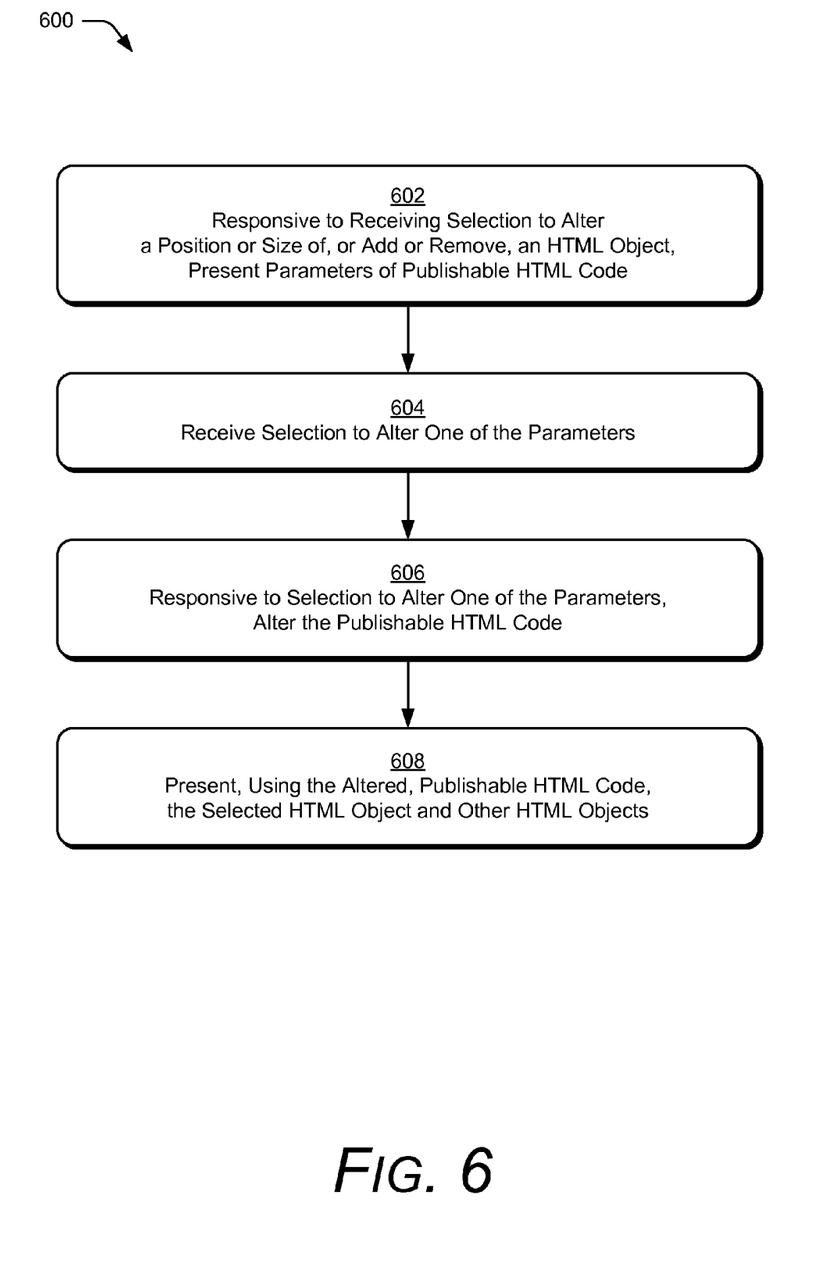
FIG. 6 is a flow diagram showing methods that enable a designer to alter parameters, through a design interface, effective to alter publishable HTML code.

FIG. 6 depicts methods 600 in an example implementation in which the techniques enable absolute positioning of HTML objects while determining publishable HTML code to present the HTML objects. Methods 600 also focus on presenting parameters by which a designer may alter the publishable HTML code through the design interface.

Block 602, responsive to receiving the selection to alter a position or size of, or add or remove, an HTML object in an HTML page presented through a design interface, presents parameters of publishable HTML code. By way of an ongoing example, consider FIG. 7, which illustrates design interface 120 showing a larger view of webpage 302 of FIG.

Figure 7:
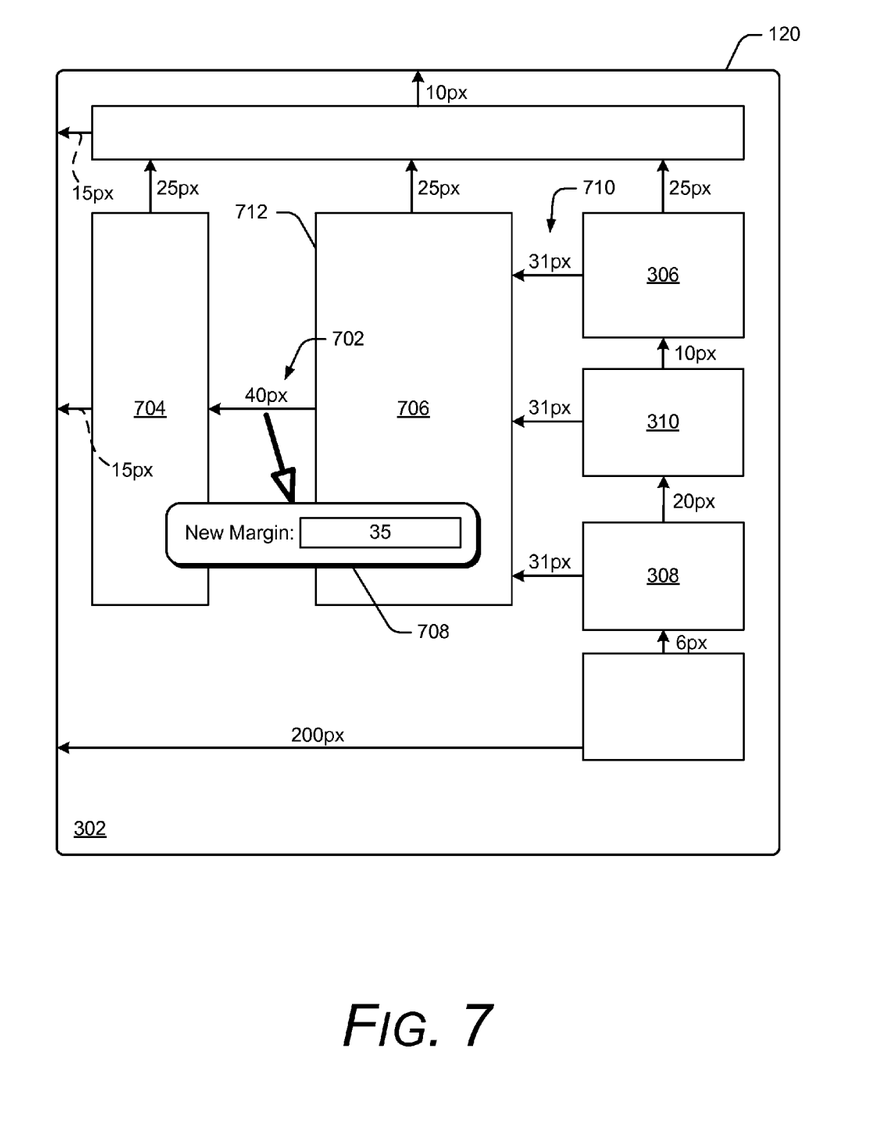
FIG. 7 illustrates a design interface showing a larger view of the webpage of FIG. 5 along with various CSS margins shown between the HTML objects.

5, the webpage after object 310 is moved, and with various CSS margins shown between the HTML objects.

Block 604 receives selection, through the design interface, to alter one of the parameters. Selection to alter a parameter is effective to alter the publishable HTML code, including, in some cases, a DOM to change an included CSS parameter. As noted above, CSS parameters may include a float, margin (as shown in FIGS. 2-4 and 7), and clearing property. Further, for many markup language layouts these and similar parameters are relative to borders or neighboring objects (e.g., margin 304 of FIG. 3 and margins 402, 404, 408, and 410 of FIG. 4).

Continuing the ongoing example, assume that a designer selects to alter margin 702 between object 704 and object 706 from 40 pixels ("px" equals pixels in the figures) to 35 pixels. Here the designer taps on margin 702, in response to which a popup window 708 is presented by design interface 120, into which the designer enters "35".

Figure 8:
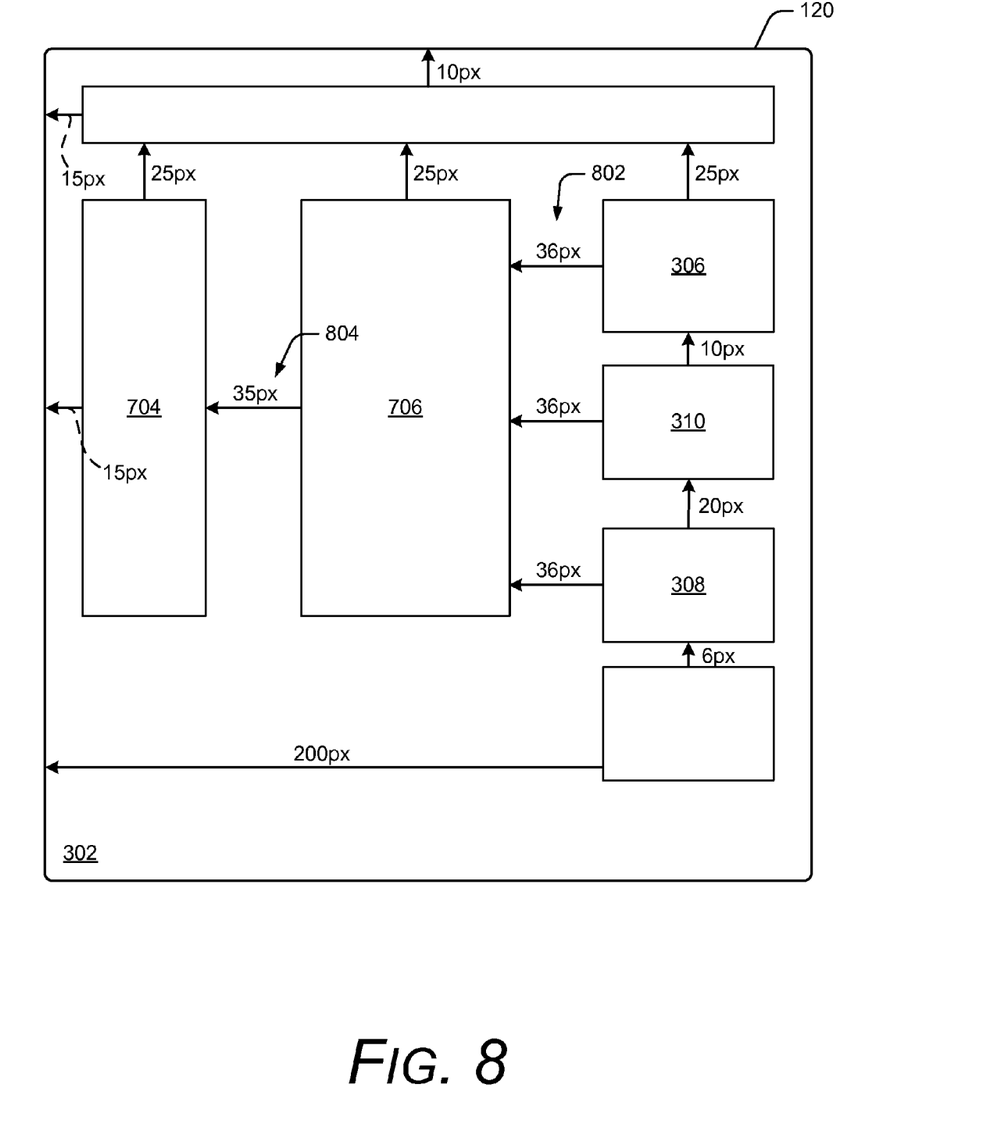
FIG. 8 illustrates the design interface of FIG. 7 along with four altered margins, one of which was altered by a designer and three of which were altered by a design module in response to the designer's alteration.

Block 606, responsive to the selection to alter one of the parameters, alters the publishable HTML code based on the altered parameter. In the ongoing example, design module 116 determines which CSS parameters to alter, alters them within the current HTML code, and thereby creates an altered and publishable HTML code. Note that while a designer may select one margin or other parameter to alter, this may affect other objects and thus their parameters. In this example, note that changing margin 702 causes other margins to also need to be altered if their positions are to be maintained. This is shown in FIG. 8, in which three margins 710 of FIG. 7, shown as 31 pixels, are altered to be 36 pixels in FIG. 8, shown at new margins 802. These alterations were caused by changing margin 702 from 40 pixels to 35 pixels (shown at new margin 804 in FIG. 8). This permits objects 306, 308, and 310 to maintain their current positions.

Block 608 presents, using the altered, publishable HTML code, the selected HTML object and the other HTML objects. As noted, this is show in FIG. 8 and concludes the ongoing example.

By way of an additional example, consider a case where a designer resizes object 310. Assume that the designer increases the width by five pixels. In such a case, design module 116 may alter margins to maintain the location of object 310 and neighboring objects. Design module 116 may, automatically or responsive to selection, alter margin 702 of FIG. 7 from 40 pixels to 35 pixels as shown at margin 804 of FIG. 8 but maintain margins 710 of FIG. 7. Or design module 116 may alter margin 702 and margins 710 by reducing them by two and three pixels, respectively (not shown). Design interface 120 can enable this selection through a pop-up window, through a select-and-move gesture of an edge 712 of object 706 (moving left five pixels), or in other manners.

As noted in part above, the techniques may move HTML objects based on a page failing, a determined negative margin, or a pre-set default or selected margin whether negative or otherwise, such as minus-four pixels, zero pixels, or 12 pixels. Assume, for example, that a designer moves object 704 with a drag-and-drop selection 30 pixels up webpage 302 of FIG. 8. In such a case, a negative margin (not shown) of minus five pixels is caused. A designer may select the minus five margin (similar to the 40 pixel margin selected in FIG. 7), and select a new margin, or the designer may simply move object 704 down. For the purposes of methods 600, assume that the designer alters the minus-five pixel margin to plus one pixel. Design module 116 alters the publishable HTML code and then presents webpage 302 with the now-positive margin. Here altering a parameter allows a precise but fast change to the publishable HTML code. This is another example of ways in which the techniques permit a WYSIWYG and easy-to-use design interface.

Example System and Device

Figure 9:
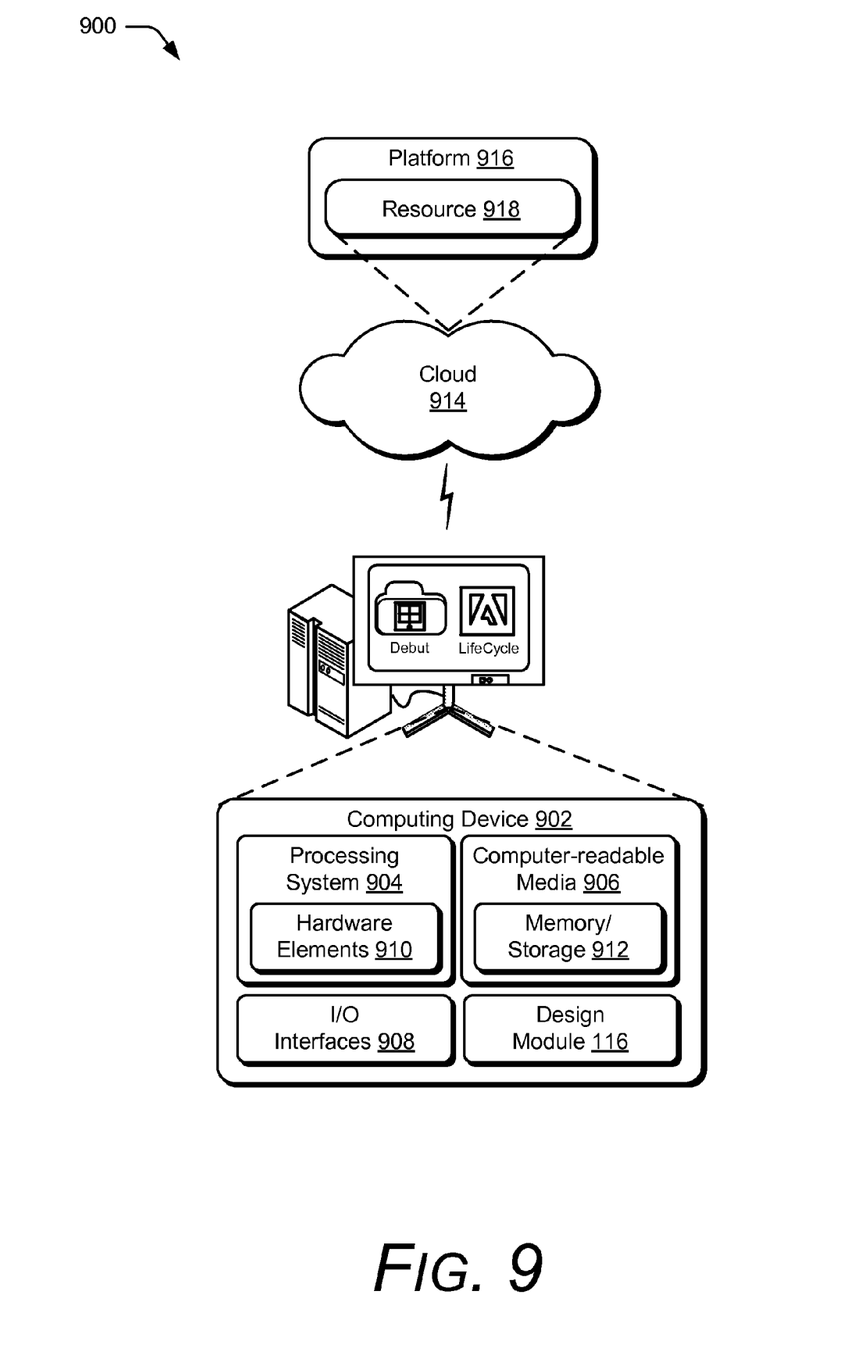
FIG. 9 illustrates an example system that can implement the techniques.

FIG. 9 illustrates an example system generally at 900 that includes an example computing device 902, which is representative of one or more computing systems and/or devices that may implement the various techniques described herein. This is illustrated through inclusion of design module 116, which may be configured to enable techniques described herein. Computing device 902 may be, for example, a server of a service provider, a device associated with a client (e.g., a client device), an on-chip system, and/or any other suitable computing device or computing system.

Computing device 902 as illustrated includes a processing system 904, one or more computer-readable media 906, and one or more I/O interface 908 that are communicatively coupled, one to another. Although not shown, computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 904 is representative of functionality to perform one or more operations using hardware. Accordingly, processing system 904 is illustrated as including hardware elements 910 that may be configured as processors, functional blocks, and so forth. This may include implementation in hardware as an application-specific integrated circuit or other logic device formed using one or more semiconductors. Hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable media 906 is illustrated as including memory/storage 912. Memory/storage 912 represents memory/storage capacity associated with one or more computer-readable media. Memory/storage 912 may include volatile media (such as random access memory (RAM)) and/or nonvolatile media (such as read only memory (ROM), Flash memory, optical disks, magnetic disks, and so forth). Memory/storage 912 may include fixed media (e.g., RAM, ROM, a fixed hard drive, and so on) as well as removable media (e.g., Flash memory, a removable hard drive, an optical disc, and so forth). Computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-Wolfe-SBMC removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and that may be accessed by a computer.

"Computer-readable signal media" may refer to a signal-bearing medium that is configured to transmit instructions to the hardware of computing device 902, such as via a network. Signal media typically may embody computer readable instructions, data structures, program modules, or other data in a modulated data signal, such as carrier waves, data signals, or other transport mechanisms. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. Computing device 902 may be configured to implement particular instructions and/or functions corresponding to the software and/or hardware modules. Accordingly, implementation of a module that is executable by computing device 902 as software may be achieved at least partially in hardware, e.g., through use of computer-readable storage media and/or hardware elements 910 of processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of computing device 902 and are not limited to the specific examples of the techniques described herein. This functionality may also be implemented all or in part through use of a distributed system, such as over a "cloud" 914 via a platform 916 as described below.

Cloud 914 includes and/or is representative of platform 916 for resources 918. Platform 916 abstracts underlying functionality of hardware (e.g., servers) and software resources of cloud 914. Resources 918 may include applications and/or data that can be utilized while computer processing is executed on servers that are remote from computing device 902. Resources 918 can also include services provided over the Internet and/or through a subscriber network, such as a cellular or Wi-Fi network.

Platform 916 may abstract resources and functions to connect computing device 902 with other computing devices. Platform 916 may also serve to abstract scaling of resources to provide a corresponding level of scale to encountered demand for resources 918 that are implemented via platform 916. Accordingly, in an interconnected device embodiment, implementation of functionality described herein may be distributed throughout system 900. For example, the functionality may be implemented in part on computing device 902 as well as via platform 916 that abstracts the functionality of cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
receiving, in a design interface presenting an HTML page, a selection to move a selected HTML object from a first position relative to other HTML objects in the HTML page to a second position relative to the other HTML objects in the HTML page;

altering parameters of the selected HTML object relative to the other HTML objects to enable placement of the selected HTML object at the second position;

altering parameters of the other HTML objects affected by said altered parameters of the selected HTML object to enable maintenance of positions of the other HTML objects relative one another;

determining, using the altered parameters, publishable HTML code to enable presentation in the HTML page of the selected HTML object at the second position while maintaining the positions of the other HTML objects;

presenting, based on the publishable HTML code determined using the altered parameters:
the selected HTML object at the second position and the other HTML objects at their respective positions; and
parameters for the selected HTML object and the other HTML objects, the parameters presented among the selected HTML object and the other HTML objects within the design interface;

receiving selection to alter a selected parameter of the parameters presented within the design interface;

determining, using the selected parameter, publishable HTML code to enable presenting the selected HTML object and the other HTML objects to reflect said alteration of the selected parameter; and presenting, based on the publishable HTML code determined using the selected parameter, the selected HTML object and the other HTML objects.

2. A method as described in claim 1, wherein said altering the parameters of the selected HTML object and the other HTML objects includes altering one or more of Cascading Style Sheet (CSS) float, margin, and clearing properties for the selected HTML object and the other HTML objects.

3. A method as described in claim 1, wherein said altering parameters of the other HTML objects includes altering margin values of the other HTML objects that neighbor the selected HTML object when at the first position.

4. A method as described in claim 1, wherein said determining the publishable HTML code determines a location for the selected HTML object in a Document Object Model (DOM) for the HTML page, the location based on the second position.

5. A method as described in claim 1, wherein said altering the parameters of the other HTML objects includes altering a negative margin of one of the other HTML objects based on a negative margin affected by said altered parameters of the selected HTML object.

6. A method as described in claim 1, wherein said receiving the selection to move the selected HTML object includes receiving a drag-and-drop selection of the selected HTML object from the first position to the second position within the HTML page.

7. A method as described in claim 1, wherein said presenting the parameters for the selected HTML object and the other HTML objects presents various Cascading Style Sheet (CSS) margins among the HTML object and the other HTML objects within the HTML page.

8. A method as described in claim 1, wherein the first position of the selected HTML object, the second position of the selected HTML object, and the positions of the other HTML objects are absolute positions on the HTML page.

9. A method as described in claim 8, wherein the absolute positions are fixed on the HTML page and wherein said altering the parameters of the other HTML objects enables.

10. A method as described in claim 1, wherein said presenting the parameters for the selected HTML object and the other HTML objects occurs responsive to said presenting the selected HTML object and the other HTML objects based on the publishable HTML code determined using the altered parameters.

11. A method as described in claim 1, wherein the parameters of the selected HTML object and the other HTML objects describe relative positioning of the selected HTML object and the other HTML objects to one another.

12. A method as described in claim 1, further comprising:
responsive to receiving the selection to move the selected HTML object, presenting parameters for the selected HTML object and the other HTML objects among the selected HTML object and the other HTML objects within the design interface;
determining intermediate publishable HTML code during said moving the selected HTML object to the second position; and
presenting, based on the intermediate publishable HTML code, parameters for the selected HTML object and the other HTML objects in the design interface during said moving the selected HTML object to the second position.

13. A method as described in claim 1, wherein said receiving the selection to move the selected HTML object comprises a selection to resize the selected HTML object from the first position to the second position.

14. One or more computer-readable storage media comprising instructions stored thereon that, responsive to execution by a computing device, cause the computing device to perform operations comprising:
receiving, in a design interface presenting an HTML page, a selection to move a selected HTML object from a first position relative to other HTML objects in the HTML page to a second position relative to the other HTML objects in the HTML page;
altering parameters of the selected HTML object relative to the other HTML objects to enable placement of the selected HTML object at the second position;
altering parameters of the other HTML objects affected by said altered parameters of the selected HTML object to enable maintenance of positions of the other HTML objects relative one another;
determining, using the altered parameters, publishable HTML code to enable presentation in the HTML page of the selected HTML object at the second position while maintaining the positions of the other HTML objects;
presenting, based on the publishable HTML code determined using the altered parameters:
the selected HTML object at the second position and the other HTML objects at their respective positions; and
parameters for the selected HTML object and the other HTML objects, the parameters presented among the selected HTML object and the other HTML objects within the design interface;
receiving selection to alter a selected parameter of the parameters presented within the design interface;
determining, using the selected parameter, publishable HTML code to enable presenting the selected HTML object and the other HTML objects to reflect said alteration of the selected parameter; and presenting, based on the publishable HTML code determined using the selected parameter, the selected HTML object and the other HTML objects.

15. One or more computer-readable storage media as described in claim 14, wherein the parameters for the selected HTML object and the other HTML objects are Cascading Style Sheet (CSS) float, margin, and clearing properties for the selected HTML object and the other HTML objects.

16. One or more computer-readable storage media as described in claim 14, the operations further comprising:
responsive to receiving the selection to move the selected HTML object, presenting parameters for the selected HTML object and the other HTML objects among the selected HTML object and the other HTML objects within the design interface;
determining intermediate publishable HTML code during said moving the selected HTML object to the second position; and
presenting, based on the intermediate publishable HTML code, parameters for the selected HTML object and the other HTML objects in the design interface during said moving the selected HTML object to the second position.

17. A system comprising:
one or more processors;
one or more computer-readable storage media comprising instructions stored thereon that, responsive to execution by the processors, cause the processors to perform operations including:
receiving, in a design interface presenting an HTML page, a selection to move a selected HTML object from a first position relative to other HTML objects in the HTML page to a second position relative to the other HTML objects in the HTML page;
altering parameters of the selected HTML object relative to the other HTML objects to enable placement of the selected HTML object at the second position;
altering parameters of the other HTML objects affected by said altered parameters of the selected HTML object to enable maintenance of positions of the other HTML objects relative one another;
determining, using the altered parameters, publishable HTML code to enable presentation in the HTML page of the selected HTML object at the second position while maintaining the positions of the other HTML objects;
presenting, based on the publishable HTML code determined using the altered parameters:
the selected HTML object at the second position and the other HTML objects at their respective positions; and
parameters for the selected HTML object and the other HTML objects, the parameters presented among the selected HTML object and the other HTML objects within the design interface;
receiving selection to alter a selected parameter of the parameters presented within the design interface;
determining, using the selected parameter, publishable HTML code to enable presenting the selected HTML object and the other HTML objects to reflect said alteration of the selected parameter; and
presenting, based on the publishable HTML code determined using the selected parameter, the selected HTML object and the other HTML objects.

18. A system as described in claim 17, wherein the publishable HTML code is configured to be published by a browser without an additional publishing step or post-processing step.

19. A system as described in claim 17, wherein said altering the parameters of the other HTML objects includes:
parsing a Document Object Model (DOM) to determine the positions of the other HTML objects within the HTML page; and
determining, based on Cascading Style Sheet (CSS) values for the selected HTML object at the second position, CSS values for the other HTML objects that will not be affected by the CSS values for selected HTML object at the second position.

20. A system as described in claim 17, wherein the operations further include:
determining intermediate publishable HTML code during said movement of the selected HTML object to the second position, the intermediate publishable HTML code based on parameters of the other HTML objects affected by said movement of the selected HTML object;
flagging changes to the parameters of the other HTML objects affected by said movement of the selected HTML object for later use in said altering the parameters of the other HTML objects affected by said altered parameters of the selected HTML object.

* * * * *